US008863158B1

(12) United States Patent
Lewis et al.

(10) Patent No.: US 8,863,158 B1

(45) Date of Patent: Oct. 14, 2014

(54) INTENTS WITH APPLICATION-SPECIFIC DATA

(71) Applicant: Google Inc., Mountain View, CA (US)

(72) Inventors: Justin Lewis, Marina del Rey, CA (US); Jonathan William Ray, Venice, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/096,765

(22) Filed: Dec. 4, 2013

(51) Int. Cl.
*G06F 13/00* (2006.01)
*G06F 9/54* (2006.01)

(52) U.S. Cl.
CPC . *G06F 9/54* (2013.01); *G06F 9/547* (2013.01)
USPC .......................................................... 719/330

(58) Field of Classification Search
CPC ....................................................... G06F 9/547
USPC .......................................................... 719/330
See application file for complete search history.

(56) References Cited

U.S. PATENT DOCUMENTS

| | | | | |
|---|---|---|---|---|
| 8,327,005 | B2 | 12/2012 | Schroeder et al. | |
| 8,327,006 | B2 * | 12/2012 | Schroeder et al. | 709/229 |
| 8,544,095 | B2 | 9/2013 | Mahaffey et al. | |
| 8,661,103 | B2 * | 2/2014 | Mehta et al. | 709/223 |
| 2011/0314115 | A1 * | 12/2011 | Nagaraj | 709/206 |
| 2012/0036507 | A1 | 2/2012 | Jonnala et al. | |
| 2013/0246515 | A1 * | 9/2013 | Bade et al. | 709/203 |
| 2013/0326590 | A1 | 12/2013 | Schroeder et al. | |
| 2013/0332723 | A1 | 12/2013 | Tan et al. | |

* cited by examiner

*Primary Examiner* — Andy Ho

(74) *Attorney, Agent, or Firm* — Amin, Turocy & Watson, LLP

(57) ABSTRACT

Improvements to previous intents frameworks/platforms are provided. In particular, previous general-purpose data common to intents frameworks can be augmented with application-specific data, which can provide numerous benefits or advantages. For example, applications that implement an intent can be supplied with information that can be used by the implementing application to enhance the services associated with the implementing application.

20 Claims, 9 Drawing Sheets

INTENTS WITH APPLICATION-SPECIFIC DATA

TECHNICAL FIELD

This disclosure generally relates to enhancements to an intents framework that facilitates communication between applications associated with various services in a service- or application-agnostic manner and more specifically to enhancements to the intents framework than support the use of service- or application-specific data.

BACKGROUND

The intents framework includes a service discovery mechanism and enables a first application to communicate with a second application associated with a service without any requirement that either application has foreknowledge of the other. As a result, a number of general purpose intents or "actions" can be implementing by the second application based on general data provided by the first application. For example, a media-based application executing on a computing device can use the intents framework to upload a user profile image to many different services (e.g., social networking services). Each social networking service can have a different application with different expectations and requirements, but each can leverage the intents framework in a general-purpose way to communicate with the media-based application and receive the image.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to employing application-specific data in connection with an intents framework. A registration component can be configured to record a set of services to a registry in accordance with an intents framework that facilitates communication between a source application that originates an intent of the intents framework and an implementing application that implements the intent. The implementing application is included in a set of applications associated with the set of services. A receiving component can be configured to receive action data associated with the intent. The action data includes application-specific data that is specific to an application of the set of applications. An action component can be configured to determine a subset of the set of services that support the intent based the registry, and provide the action data to the implementing application that is associated with a service of the subset.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
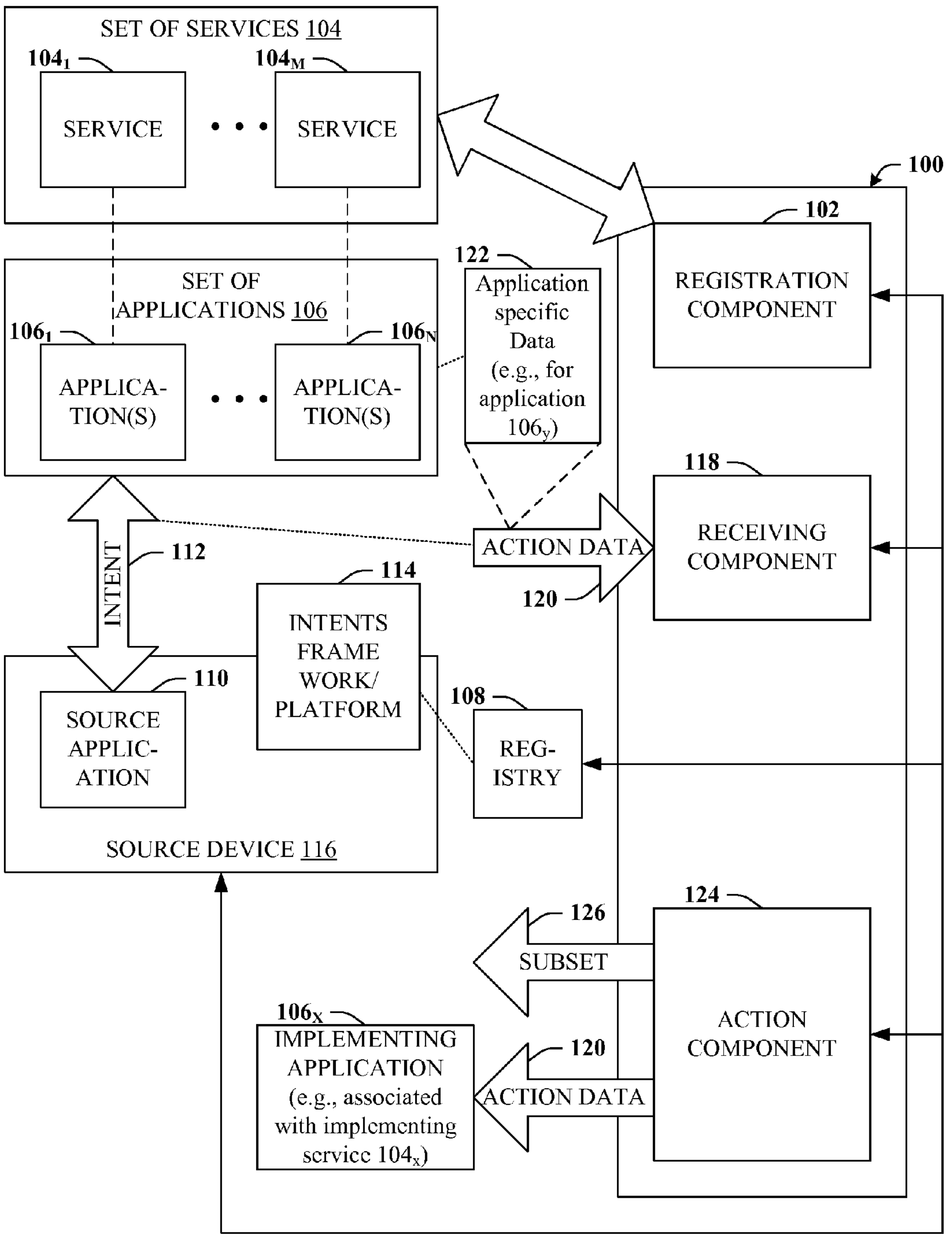
FIG. 1 illustrates a block diagram of an example system that can provide application-specific data in connection with an intents framework and/or platform in accordance with certain embodiments of this disclosure.

With previous solutions the intents framework operated by providing identical, general-purpose data from a source application (e.g., an application that originates the intent) to all implementing applications (e.g., applications that implement the intent). The intents framework enables a wide variety of intents or "actions" to be performed by the implementing application regardless of its configuration or the configuration of the source application (e.g., the source application is not required to be specifically designed to interface with the implementing application). Therefore, while the remainder of this specification utilizes an intent to share as the primary example of an intent, it is understood that numerous other intent types exist and can leverage the disclosed subject matter.

Despite the success of previous intents frameworks, certain shortcomings exist in some implementations. For example, consider three hypothetical and/or fictitious services: "MeTube," which is primarily a content hosting service in which users can upload or view videos or other content; "FacePage," which is a social networking services that enables users to post information that other users can view; and "Chatter," which is another social networking service that differs from FacePage. Consider Ashley and Ross, who each have accounts with one or more of these services. Suppose Ashley posts a video on MeTube that Ross views with an application executing on a device (e.g., a mobile device, home computer, etc.). Ross finds Ashley's video very compelling and wants to share it with his friends via his FacePage account and his Chatter account. This "share intent" can be facilitated by the intents framework, wherein the source application of Ross's device originates the share intent and an implementing application at either or both FacePage and Chatter implement the share intent.

In accordance with previous implementations, respective applications for both FacePage and Chatter will receive the exact same data, which is sufficient to enable both those services to implement a post to Ross's stream that includes or links to Ashley's video. A source of one difficulty is that, typically, both FacePage and Chatter will have ranking mechanisms associated with posts, and these ranking mechanisms can be quite different. For example, suppose that thirty of Ross's friends at FacePage view the video by clicking on an embedded link associated with the post. Further suppose that ten of his friends share the same video and so on until the video goes viral with a tremendous amount of views and shares.

Unfortunately, FacePage's internal ranking system is not equipped to correctly rank the popularity of the video in this case because each share is treated as a standard link and is therefore penalized with a rather low click-through rate (CTR), even though the aggregate CTR for the many shares might be very high. Similar issues can arise in terms of Ross's shares of Ashley's video on Chatter as well.

In order to resolve these and other issues, embodiments of the disclosed subject matter propose to include application-specific data in connection with the intents framework. Such data can be, for example, an app ID that is specific to the respective implementing applications. For example, a first app ID that is specific to a MeTube-FacePage application and a second app ID that is specific to a MeTube-Chatter application can be passed along with any other common intents data to the implementing application. By receiving these app IDs (or other application-specific data), the implementing application can associate all such posts or shares of Ashley's MeTube content in a manner that is specific to the implementing service and that can be properly ranked by the implementing service.

In some embodiments, the app ID or other application-specific data can be restricted by the source application and/or the improved intents framework. For instance, application-specific data that is specific to FacePage can be restricted so that applications not associated with the FacePage service do not receive that data. Application-specific data that is specific to Chatter can be restricted so that applications not associated with the Chatter service do not receive that data. In other words, servers, applications, etc. associated with the Chatter service might receive all the common intents data and application-specific data that is specific to Chatter, but not application-specific data that is specific to FacePage. The disclosed subject matter can facilitate such by restricting the transmission of certain application-specific data to any or all destinations not associated with the application or service to which the application-specific data is specific to.

Example System that Implements an Intents Framework with Application-Specific Data Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

Referring now to FIG. 1, a system 100 is depicted. System 100 can, inter alia, provide application-specific data in connection with an intents framework and/or platform. Embodiments disclosed herein can, for example, enable applications or services associated with the implementing application to provide additional or improved features such as, for example, improved ranking mechanisms for shared content. System 100 can include a memory that stores computer executable components and a processor that executes computer executable components stored in the memory, examples of which can be found with reference to FIG. 8. It is to be appreciated that the computer 802 can be used in connection with implementing one or more of the systems or components shown and described in connection with FIG. 1 and other figures disclosed herein. As depicted, system 100 can include a registration component 102, a receiving component 118, and an action component 124.

Registration component 102 can be configured to record set of services 104, which can be associated with set of applications $\mathbf{106_1}$-$\mathbf{106_N}$. Set of services 104 can include substantially any number, M, of individual services $\mathbf{104_1}$-$\mathbf{104_M}$, and set of applications 106 can include substantially any number, N, of individual applications $\mathbf{106_1}$-$\mathbf{106_N}$, which are hereinafter respectively referred to, either individually or collectively, as service(s) 104 and application(s) 106, with appropriate subscripts generally employed only when instructive or convenient to highlight various distinctions or to better impart the disclosed concepts. In some embodiments, some or all services 104 can be associated with service-specific applications 106. For example, application $\mathbf{106_1}$ can be associated with service $\mathbf{104_1}$.

Record of the set of services 104 can be stored to registry 108 in accordance with intents framework 114. Intents framework 114 can be configured to facilitate communication between source application 110 that originates an intent 112 of intents framework 114 and an implementing application $\mathbf{106_X}$ that implements intent 112. Implementing application $\mathbf{106_X}$ is denoted with an "X" subscript to illustrate that the implementing application $\mathbf{106_X}$ can potentially be any member(s) of the set of applications 106, specifically, the application(s) 106 that ultimately implements intent 112.

As previously noted, intents framework 114 can facilitate inter-application communication as well as service discovery. Registration component 102 can facilitate all or a portion of the discovery service. Services (e.g., services 104) discovered and registered to registry 108 can be utilized in accordance with previous intents platforms as well as in accordance with subject matter disclosed herein. For example, consider the scenario introduced above in connection with two fictitious services, FacePage (e.g., service $\mathbf{104_1}$) and Chatter (e.g., service $\mathbf{104_2}$). In some embodiments, registry 108 might include data that identifies both services 104 as well as other various services 104. All or a portion can be included in system 100, in a source device 116 (e.g., mobile device, console, desktop computer, etc.) that executes source application 110, and/or in a server or other device (not shown) associated with a service 104. When source application 110 originates intent 112 (e.g., a share intent), registration component 102 or another component associated with system 100 can poll all or a portion of registered services 104 included in registry 108 in order to determine which services 104 support the particular type of intent 112.

In some embodiments, registry 108 might include additional information such as types of intents 112 that are supported by the various registered services 104. In such embodiments, it might not be necessary to poll each of the services 104 to discovered whether or not those services 104 support the particular type of intent 112. Rather, such can be determined based on registry 108 alone. For example, suppose registry 108 includes data associated with two registered services 104, FacePage and Chatter, and further includes data that indicates both FacePage and Chatter support share actions or intents 112. In that case, when source application 110 initiates a share intent 112 with either (or both) services 104, then system 100 can determine that either service 104 supports the share intent 112 based on registry 108 alone, or at least without any addition communication with services 104 or associated devices.

Receiving component 118 can be configured to receive action data 120 associated with intent 112. All or a portion of action data 120 can be received from source application 110, from source device 116, or from another entity. Action data 120 can include data that is common to previous implementations of an intents framework that is typically general purpose and not specific to a given application or service as well as application-specific data 122 that is specific to a given application $\mathbf{106}_Y$ or an associated service 104. Subscript "Y" is utilized to denote the particular application $\mathbf{104}_Y$ (or the associated service $\mathbf{104}_Y$) to which application-specific data 122 relates. It is understood that implementing application $\mathbf{104}_X$ might or might not differ from application $\mathbf{104}_Y$. It is understood that application-specific data 122 can relate to information that is not necessarily relevant to implementing intent 112, as that can be provided by common intent data included in action data 120. Rather application-specific data 122 can relate to information that aids implementing application $\mathbf{106}_X$ with transactions after intent 112 has been implemented. Various non-limiting examples of action data 120 are detailed in connection with FIG. 2.

Figure 2:
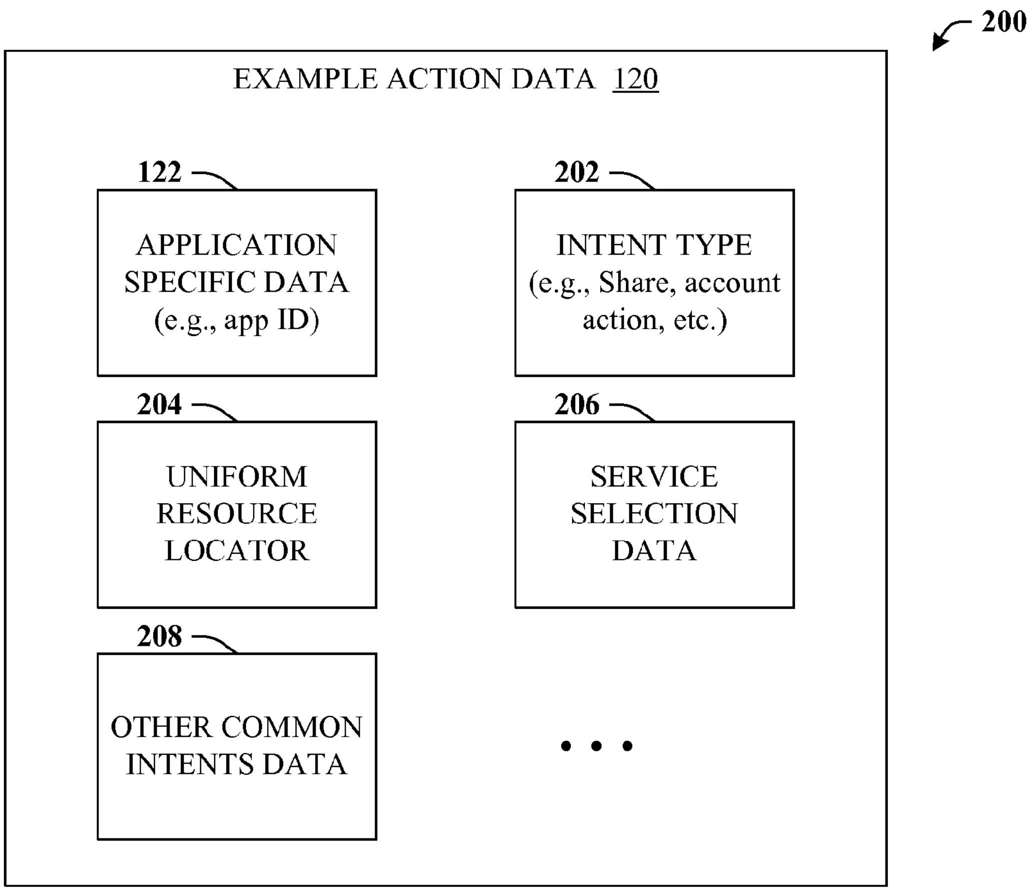
FIG. 2 illustrates a block diagram that depicts numerous examples of action data in accordance with certain embodiments of this disclosure.

While still referring to FIG. 1, but referring also to FIG. 2, illustration 200 is provided. Illustration 200 depicts numerous examples of action data 120. In general, data that constitutes action data 120 can be separated into to broad categories: data that is application-specific and data that is general-purpose such as common intents framework data. For example, action data 120 can include application-specific data 122. Application-specific data can represent any data that can be used by a potential implementing application $\mathbf{104}_X$. As one example, the application-specific data 122 can relate to an app ID. This app ID can identify an application that is executed in connection with a particular service 104.

Action data 120 can also include intent type 202 such as a share intent that describes an action associated with sharing data between disparate applications 106. It is understood that intent type 202 can be expressly indicated by action data 120, or inferred from action data 120. For example, in cases in which intent type 202 is a share intent, then action data can further include a uniform resource locator 204 or uniform resource indicator relating to the content to be shared as well as other data from which it can be inferred that intent type 202 is a share intent, even if intent type 202 is not expressly included in action data 120.

As another example, action data 120 can include service selection data 206. For instance, suppose source application 110 invokes a share intent 112. System 100 can reference registry 108 and determine which services 104 support the share intent 112. Thereafter, a list of supporting services can be presented out of which a user might select one or more. For example, suppose the user selected FacePage from a menu of several appropriate services 104 as the service 104 to share certain content. Data associated with that selection can represent service selection data 206. It is understood that other common intents data 208 can be included in action data 120.

Still referring to FIG. 1, system 100 can include action component **1*w*4. Action component 124 can be configured to determine subset 126 of set of services 104 that support intent 112. Such a determination can be based on registry 108. For example, action component 124 can identify all registered services 104 and poll all or a portion of those services 104 to request support information, or such support information can be included in (or inferred from other data in) registry 108. Thus, subset 126 can include all registered applications 104 that support intent 112**.

Action component 124 can be further configured to provide action data 120 to implementing application $\mathbf{106}_X$ that is associated with service $\mathbf{104}_X$ of subset 126. For example, if it is indicated (e.g., via a service selection menu or the like) that the fictitious service FacePage is selected in connection with intent 112, then FacePage is the implementing service $\mathbf{104}_X$ and some application being executed by a device (e.g., server device) associated with the FacePage service is the implementing application $\mathbf{106}_X$. This implementing service $\mathbf{104}_X$ is included in the set of services 104 (since that service was previously registered to registry 108) and subset 126 (since that service was determined to support intent 112). The implementing application $\mathbf{106}_X$ is included in set of applications 106 associated with subset 126 and/or service 104. In some embodiments, action data 120 is transmitted to implementing application $\mathbf{106}_X$ via a remote procedure call. In some embodiments, only a portion of action data 120 is transmitted to implementing application $\mathbf{106}_X$, which is further detailed with reference to FIG. 3.

Figure 3:
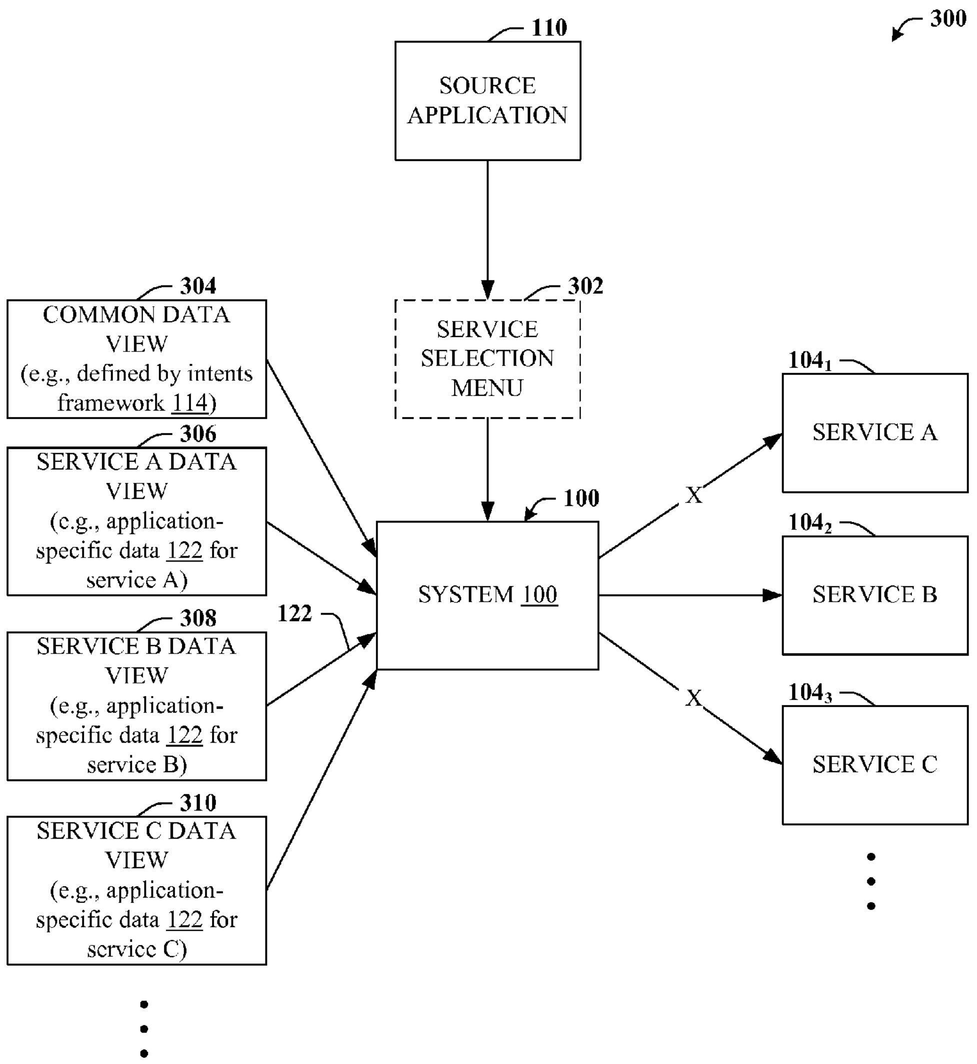
FIG. 3 illustrates a block diagram of a system that relates to restricting provision of at least a portion of the action data in connection with an intents framework that supports application-specific data in accordance with certain embodiments of this disclosure.

Still referring to FIG. 1, but turning also to FIG. 3, system 300 is provided. System 300 relates to restricting provision of action data 120 in connection with an intents framework that supports application-specific data. For example, assume at least three services, service A, service B, and service C, have been registered to registry 108, denoted here as services $\mathbf{104}_1$-$\mathbf{104}_3$, and these three services 104 have been determined to support a particular intent 112. System 100 can be exposed to common data view 304 that can relate to data defined by intents framework 114. In addition, system 100 can be exposed to a service A data view 306, a service B data view 308, and service C data view 310. These data views 306-310 can relate to application-specific data 122 for applications 106 associated with the respective services A, B, and C.

In one example, suppose that application-specific data 122 is received in connection with an application $\mathbf{106}_Y$ that is associated with service B, which can be provided by service B data view 308. Such is a simple example, for illustrative purposes, as it is understood that generally system 100 can receive application-specific data 122 from each of the data views 306-310. Further suppose source application 110 originates intent 112 in order to perform some cross-application action in connection with a service $\mathbf{104}_1$-$\mathbf{104}_3$. Optionally, a service selection menu 302 can be presented to a user of source application 110 that lists the available services that can support that intent 112, in this case services a list of services A, B, and C, in which service B is selected. In that case, system 100 can provide action data 120 to a device associated with service B, but restrict action data 120 to services A and C, as denoted by the "X".

In this example, the application $\mathbf{106}_Y$ for which application-specific data 122 was received is also the implementing application $\mathbf{106}_X$. It is appreciated that portions of action data 120 might still be capable of provision to services A and C, such as data associated with common data view 304 or data that is specific to applications of those services. It is further appreciated that in some embodiments, certain portions of action data 120 can be restricted from provision to service B such as, e.g., application-specific data 122 that relates to service A or service C.

Figure 4:
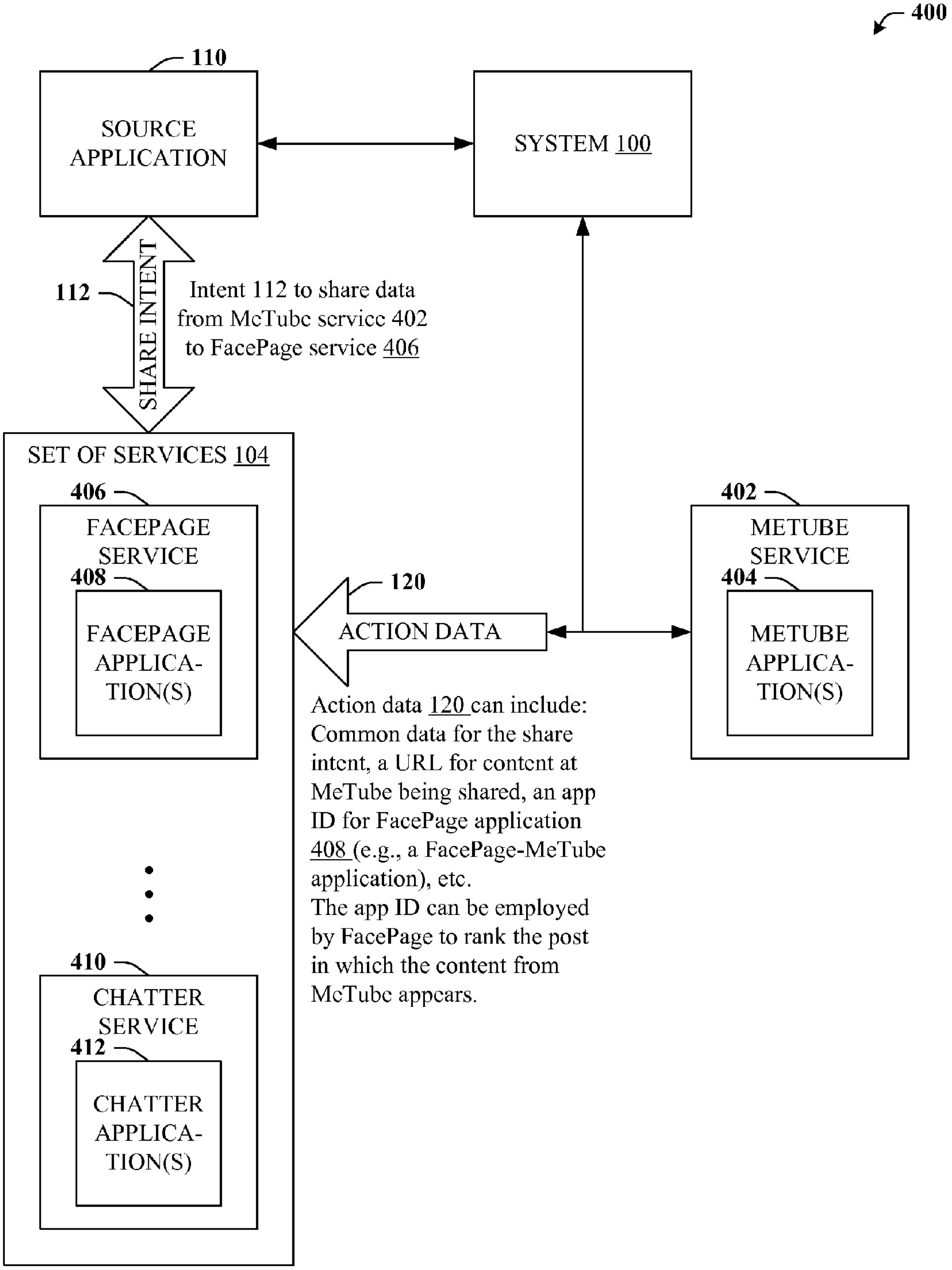
FIG. 4 illustrates a block diagram of a system that provides an example implementation in connection with a share intent in accordance with certain embodiments of this disclosure.

With reference now to FIG. 4, system 400 is provided. System 400 provides an example implementation in connection with a share intent. Returning again to the scenario introduced previously, consider MeTube service 402 that relates in part to content hosting, with one or more applications 404 executing on devices associated with service 402. In addition, set of services 104 are registered to registry 108 and include at least FacePage service 406 (relating to at least one application 408 executing on a device associated with service 406) and Chatter service 410 (relating to at least one application 412 executing on a device associated with service 410).

Source application 110, which can be executing on device 116, can originate share intent 112 that can represent an intention to share data from MeTube service 402 to FacePage service 406. In response, action data 120 can be generated by system 100, some of which can be provided from a device associated with MeTube service 402 or MeTube application(s) 404. Action data 120 can be provided to set of services 104 or specifically to a device associated with FacePage service 406 or FacePage application(s) 408. Action data can include, e.g., common data for share intent 112, a uniform resource locator for content being shared (e.g., from MeTube), an app ID associated with the implementing service, in this case FacePage (e.g., a MeTube-FacePage app ID), and so on. The app ID can be employed by FacePage to appropriately rank the post in which content from MeTube appears.

As was previously detailed, in some implementations, application-specific data 122 can relate to information that is not necessarily relevant to implementing intent 112, as that can be provided by common intent data included in action data 120. Rather application-specific data 122 can relate to information that aids implementing application $\mathbf{106}_X$ with transactions after intent 112 has been implemented. For instance, FacePage might not utilize application-specific data 122 to actually implement share intent 112 or might not use such data exclusively for that purpose. In fact, FacePage might utilize application-specific data 122 in a matter that provides additional features to its users and/or improves the experience for those users. For instance, the FacePage might utilize application-specific data 122 in connection with an internal ranking system that ranks posts made by users. The application-specific data 122 can be employed to associated all the shares to the same app ID, and therefore provide more realistic ranking.

Example Methods for Identifying Top Fans

Figure 5:
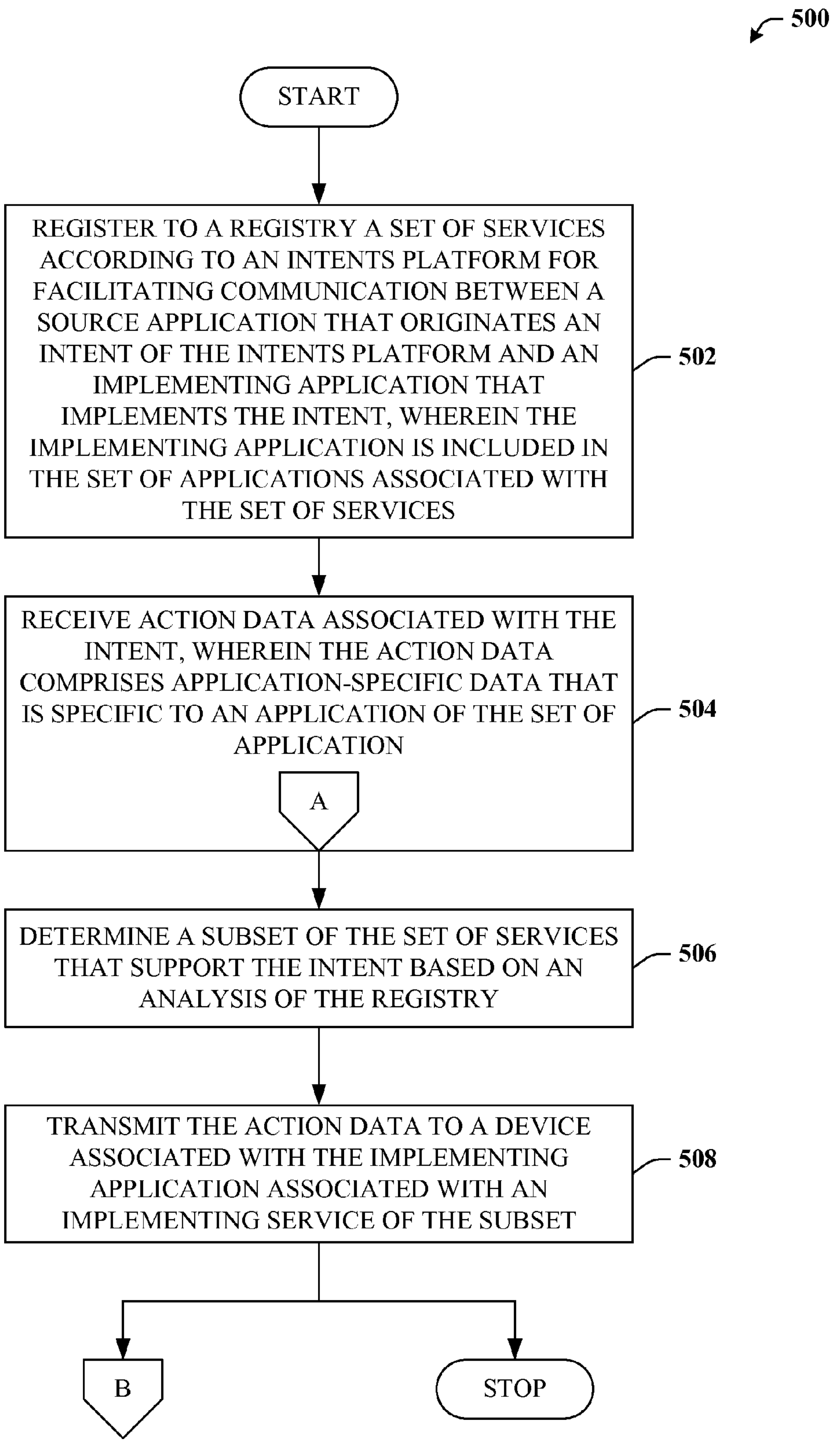
FIG. 5 illustrates an example methodology that can provide for utilizing application-specific data in connection with an intents platform in accordance with certain embodiments of this disclosure.
Figure 6:
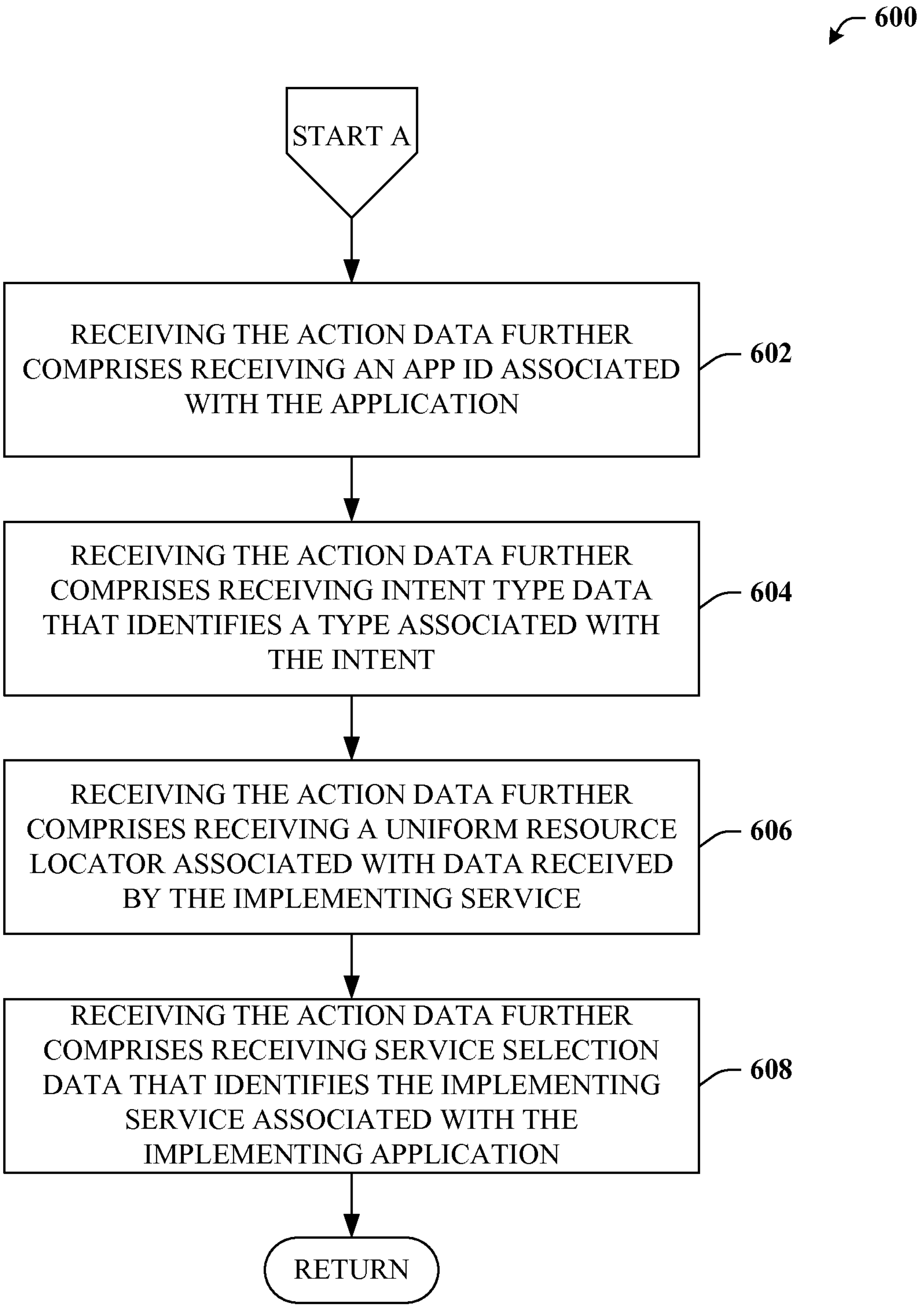
FIG. 6 illustrates an example methodology that can provide for additional features or aspects in connection with receiving action data associated the intent in accordance with certain embodiments of this disclosure.
Figure 7:
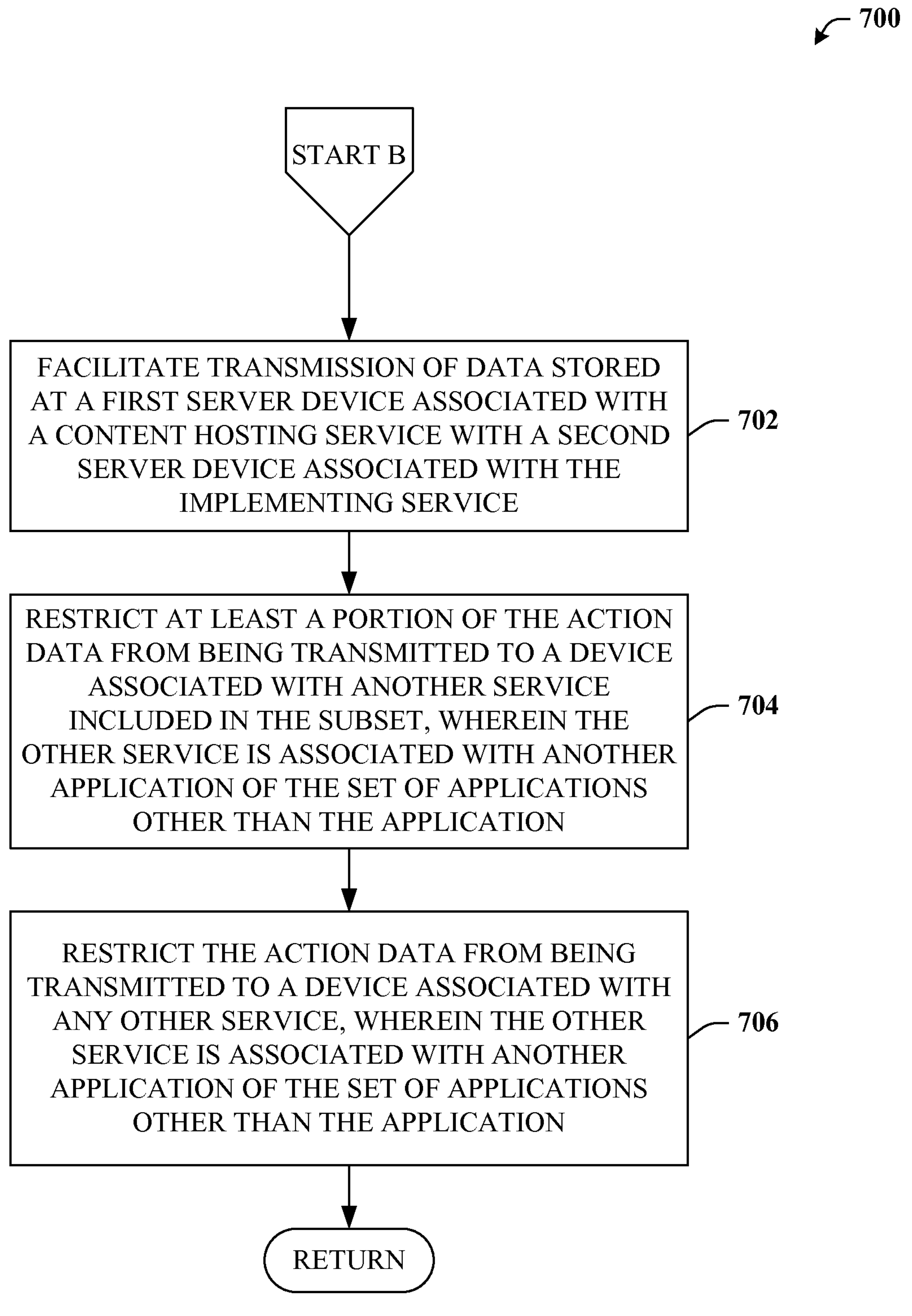
FIG. 7 illustrates an example methodology that can provide for additional features or aspects in connection with utilizing application-specific data in connection with an intents platform in accordance with certain embodiments of this disclosure.

FIGS. 5, 6, and 7 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 5 illustrates exemplary method 500. Method 500 can provide for utilizing application-specific data in connection with an intents platform. For example, at reference numeral 502, a set of services can be registered to a registry (e.g., by a registration component) according to an intents platform for facilitating communication between a source application that originates an intent of the intents platform and an implementing application that implements the intent. The implementing application can be included in the set of applications and the set of applications can be associated with the set of services.

At reference numeral 504, action data associated with the intent can be received (e.g., by a receiving component). The action data can comprise various data that are common to the intents platform as well as application-specific data that is specific to an application of the set of applications. Method 500 can proceed to insert A, which is detailed with reference to FIG. 6 and/or continue to reference numeral 506.

At reference numeral 506, a subset of the set of services can be determined (e.g., by an action component). The subset can include members of the set of services that are determined to support the intent. Such determinations can be made based on analysis of the registry. In some embodiments, determinations can be made by polling services included in the registry.

At reference numeral 508, the action data can be transmitted (e.g., by the action component) to a device associated with the implementing application associated with an implementing service of the subset. Method 500 can terminate or proceed to insert B further detailed in connection with FIG. 7.

FIG. 6 illustrates exemplary method 600. Method 600 can provide for additional features or aspects in connection with receiving action data associated the intent as detailed at reference numeral 504 of FIG. 5. For example, at reference numeral 602, the receiving can comprise receiving an app ID associated with the application. The app ID can relate to a potentially unique number or other identifier that describes the application. In some embodiments, the app ID number can be employed to associate transactions with a particular app ID. In some embodiments, the action data can include data based on transformations of application-specific data.

At reference numeral 604, the receiving can comprise receiving intent type data that identifies a type associated with the intent. The intent type data can be express or inherent and/or inferred from other action data. At reference numeral 606, the receiving can comprise receiving a uniform resource locator associated with data (e.g., content) received by the implementing service. At reference numeral 608, the receiving can comprise receiving service selection data that identifies the implementing service associated with the implementing application. For example, a user can provide input to a service selection menu to indicate which service(s) are to implement the intent.

Turning now to FIG. 7, exemplary method 700 is depicted. Method 700 can provide for additional features or aspects in connection with utilizing application-specific data in connection with an intents platform. At reference numeral 702, transmission of data stored at a first server device associated with a content hosting service to a second server device associated with the implementing service can be facilitated. Such can occur in connection with a share intent or another appropriate intent.

At reference numeral 704, at least a portion of the action data can be restricted from being transmitted to a device associated with another service included in the subset, wherein the other service is associated with another application of the set of applications other than the application.

At reference numeral 706, the action data can be restricted from being transmitted to a device associated with any other service, wherein the other service is associated with another application of the set of applications other than the application. Accordingly, it is understood, based either on reference numeral 704 or 706, that not all data included in action data need be transmitted to all applications in the set of applications. Rather, some data included in action data can be transmitted to only one or even to no application included in the set of applications. Additionally or alternatively, different applications from the set of applications can receive different data, or even no data.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 8:
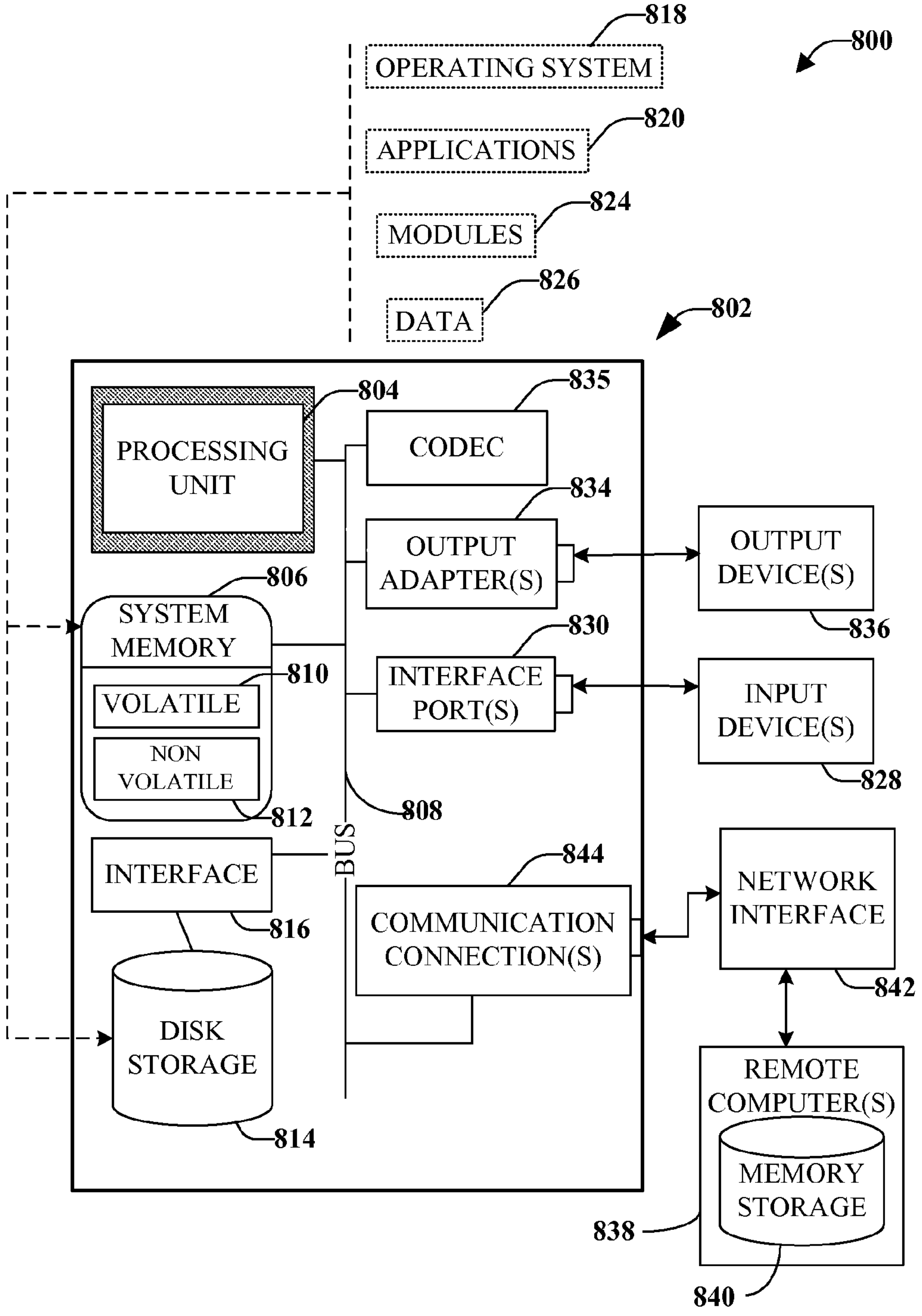
FIG. 8 illustrates an example schematic block diagram for a computing environment in accordance with certain embodiments of this disclosure.

With reference to FIG. 8, a suitable environment 800 for implementing various aspects of the claimed subject matter includes a computer 802. The computer 802 includes a processing unit 804, a system memory 806, a codec 835, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 806 includes volatile memory 810 and non-volatile memory 812. The basic input/output system (BIOS), containing the basic routines to transfer information between elements within the computer 802, such as during start-up, is stored in non-volatile memory 812. In addition, according to present innovations, codec 835 may include at least one of an encoder or decoder, wherein the at least one of an encoder or decoder may consist of hardware, software, or a combination of hardware and software. Although, codec 835 is depicted as a separate component, codec 835 may be contained within non-volatile memory 812 or included in other components detailed herein. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 802 may also include removable/non-removable, volatile/non-volatile computer storage medium. FIG. 8 illustrates, for example, disk storage 814. Disk storage 814 includes, but is not limited to, devices like a magnetic disk drive, solid state disk (SSD) floppy disk drive, tape drive, flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816. It is appreciated that storage devices 814 can store information related to a user. Such information might be stored at or provided to a server or to an application running on a user device. In one embodiment, the user can be notified (e.g., by way of output devices) 836) of the types of information that are stored to disk storage 814 and/or transmitted to the server or application. The user can be provided the opportunity to opt-in or opt-out of having such information collected and/or shared with the server or application (e.g., by way of input from input device(s) 828).

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
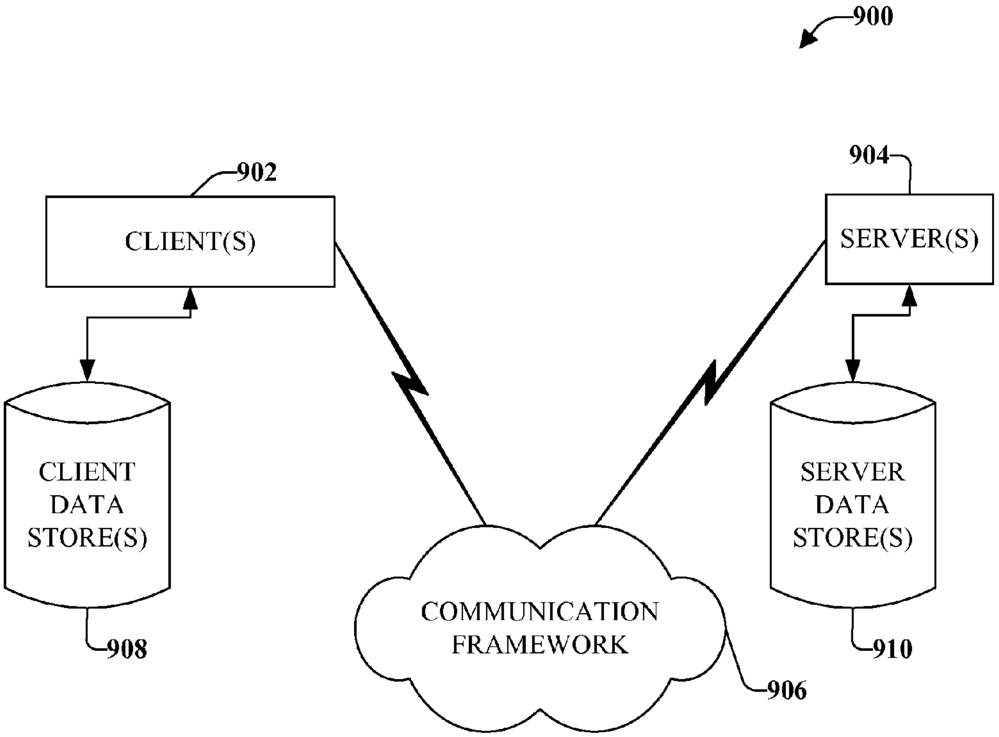
FIG. 9 illustrates an example block diagram of a computer operable to execute certain embodiments of this disclosure.

Referring now to FIG. 9, there is illustrated a schematic block diagram of a computing environment 900 in accordance with this specification. The system 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet transmitted between two or more computer processes wherein the data packet may include video data. The data packet can include a cookie and/or associated contextual information, for example. The system 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:

a memory that stores computer executable components; and a microprocessor that executes the following computer executable components stored in the memory:

a registration component that records a set of services to a registry in accordance with an intents framework that facilitates communication between a source application that originates an intent of the intents framework and an implementing application that implements the intent, wherein the implementing application is included in a set of applications associated with the set of services;

a receiving component that receives action data associated with the intent, wherein the action data includes application-specific data that is specific to an application of the set of applications; and an action component that determines a subset of the set of services that support the intent based the registry, and that provides the action data to the implementing application that is associated with a service of the subset.

2. The system of claim 1, wherein the application-specific data includes an app ID associated with the implementing application.

3. The system of claim 2, wherein the action data including the application-specific data is transmitted to the implementing application via a remote procedure call.

4. The system of claim 1, wherein the receiving component further receives intent type data that identifies a type associated with the intent.

5. The system of claim 1, wherein the type relates to a share intent associated with a sharing of data stored at a first server device associated with a content hosting service with a second server device associated with the implementing application.

6. The system of claim 5, wherein the action data further includes a uniform resource locator associated with the data at the first server device.

7. The system of claim 1, wherein the receiving component further receives service selection data that identifies the service associated with the implementing application.

8. The system of claim 7, wherein the application is the implementing application and the action component restricts at least a portion of the action data from being provided to a device associated with any other service included in the subset.

9. The system of claim 7, wherein the application is the implementing application and the action component restricts the action data from being provided to a device associated with any other service.

10. A method, comprising:

employing a computer-based processor to execute computer executable components stored in a memory to perform the following:

registering to a registry a set of services according to an intents platform for facilitating communication between a source application that originates an intent of the intents platform and an implementing application that implements the intent, wherein the implementing application is included in a set of applications associated with the set of services;

receiving action data associated with the intent, wherein the action data comprises application-specific data that is specific to an application of the set of applications;

determining a subset of the set of services that support the intent based on an analysis of the registry; and transmitting the action data to a device associated with the implementing application associated with an implementing service of the subset.

11. The method of claim 10, wherein the receiving action data further comprises receiving an app ID associated with the application.

12. The method of claim 10, wherein the receiving action data further comprises receiving intent type data that identifies a type associated with the intent.

13. The method of claim 12, further comprising facilitating transmission of data stored at a first server device associated with a content hosting service with a second server device associated with the implementing service.

14. The method of claim 13, wherein the receiving action data further comprises receiving a uniform resource locator associated with the data at the first server device.

15. The method of claim 10, wherein the receiving action data further comprises receiving service selection data that identifies the implementing service associated with the implementing application.

16. The method of claim 10, further comprising restricting at least a portion of the action data from being transmitted to a device associated with another service included in the subset, wherein the other service is associated with another application of the set of applications other than the application.

17. The method of claim 10, further comprising restricting the action data from being transmitted to a device associated with any other service, wherein the other service is associated with another application of the set of applications other than the application.

18. A non-transitory computer readable storage medium storing computer-executable instructions that, in response to execution, cause a device including a processor to perform operations, comprising:

registering to a registry a set of services according to an intents framework for facilitating communication between a source application that originates an intent of the intents framework and an implementing application that implements the intent, wherein the implementing application is included in a set of applications associated with the set of services;

receiving action data associated with the intent, wherein the action data comprises application-specific data that is specific to an application of the set of applications;

determining a subset of the set of services that support the intent based on the registry; and transmitting the action data to a device associated with the implementing application that operates in connection with an implementing service of the subset.

19. The non-transitory computer readable storage medium of claim 18, further comprising preventing at least a portion of the action data from being transmitted to a device associated with another service included in the subset, wherein the other service is associated with another application of the set of applications other than the application.

20. The non-transitory computer readable storage medium of claim 18, further comprising preventing the action data from being transmitted to a device associated with any other service, wherein the other service is associated with another application of the set of applications other than the application.

* * * * *